United States Patent [19]

Tullio

[11] 3,957,425
[45] May 18, 1976

[54] CONCENTRATED ACID RED 151 DYE-SURFACTANT SOLUTION OF 15 TO 25%

[75] Inventor: Victor Tullio, Wilmington, Del.

[73] Assignee: E. I. Du Pont de Nemours and Company, Wilmington, Del.

[22] Filed: Apr. 19, 1974

[21] Appl. No.: 462,395

[52] U.S. Cl. .......................................... 8/41 B; 8/8; 8/41 R; 8/79; 8/88; 8/89 R; 8/93; 8/169
[51] Int. Cl.² ...................... D06P 1/00; D06P 1/39
[58] Field of Search .................. 8/41 R, 41 A, 41 B, 8/41 C, 42 B, 44, 79, 88, 89, 93, 169; 260/174

[56] References Cited
UNITED STATES PATENTS

| 3,288,552 | 11/1966 | Streck | 8/44 |
| 3,622,264 | 11/1971 | Brown | 8/21 |
| 3,658,456 | 4/1972 | Hertel | 8/44 |

OTHER PUBLICATIONS

Wengraf, Paul et al., Chem. Tech. of Dyeing & Printing, Reinhold Publishers, 1948, p. 9.
Kern, R., Am. Dyestuff Reporter, May 15, 1961, p. 48.

Primary Examiner—Christopher A. Henderson, Jr.
Attorney, Agent, or Firm—James A. Costello

[57] ABSTRACT

An improved aqueous-organic solvent solution, having a pH between 10 and 13, of the disazo dye

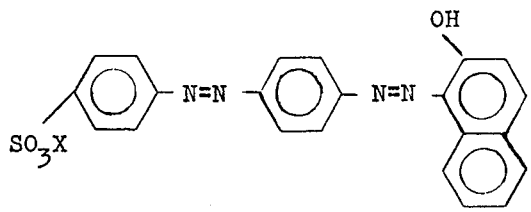

wherein X is a cation, preferably the sodium or lithium cation, the improvement comprising the presence, in combination, of i. 0.1% to 10%, by total weight, of a particular anionic surfactant, and
ii. 0.1% to 3.0%, by total weight, of a particular nonionic surfactant.

5 Claims, No Drawings

CONCENTRATED ACID RED 151 DYE-SURFACTANT SOLUTION OF 15 TO 25%

BACKGROUND OF THE INVENTION

The sodium salt of the dye described herein is known as Acid Red 151, Color Index No. 26,900. It is very effective for dyeing synthetic fibers, especially nylon. It is necessary to employ water miscible solvent(s) to aid in dissolving this disazo dye so that it will be in acceptable form for transport and use. Usually, transported solutions will have about 15% dye in solution.

Problems can arise, however, even though dye solubility is achieved for shipping and handling. For instance, when the dye liquid is diluted with additional water prior to use in a dyeing operation, the dye itself often comes out of solution. In some cases, it comes out of solution in the form of a gel, a solid phase colloidal solution. Once formed, such a gel can block transfer lines and can be very difficult to remove. The invention provides a way of overcoming this difficulty be eliminating the gelling tendency of this particular disazo dye. With the concentrated dye-surfactant solutions of this invention, water dilution of the dye concentrate results in a desirable nongelling fluid dispersion of the dye which can be handled easily.

SUMMARY OF THE INVENTION

This invention concerns an improved aqueousorganic solvent solution, having a pH between 10 and 13, of the salt of the disazo dye, p-(p-(2-hydroxy-1-naphthylazo)phenylazo)benzenesulfonic acid,

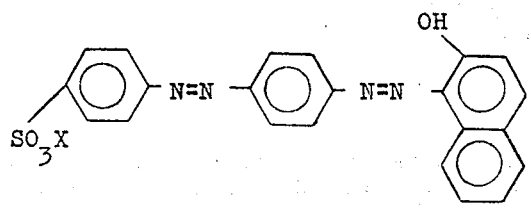

wherein X is selected from the group sodium, potassium, lithium and ammonium cations, the improvement comprising presence in the dye solution of a combination of
i. 0.1% to 10.0%, by total weight, of an anionic surfactant, and
ii. 0.1% to 3.0%, by total weight, of a nonionic surfactant, 18 18
the ratio of anionic surfactant to nonionic surfactant being between 1 to 10 and 17 to 1. Sodium and lithium dye salts are preferred.

The particular cation employed has little to do with the coloring properties of the dye. Although calcium, magnesium and other salt forms of the dye provide substrate coloring under certain conditions, they are not sufficiently soluble to give strong aqueous solutions. Of those representative cations pointed out herein, it is noted that the ammonium cation can be substituted as well as unsubstituted as will be obvious to those skilled in the art.

The anionic surfactant is a water-soluble salt of a substituted-benzene or -naphthalenesulfonic acid wherein the substituents are 1 to 3 alkyl groups of $C_1$ to $C_{14}$. The salts are preferably alkali metal salts, and most preferably sodium salts, although they can also be ammonium or substituted ammonium salts, or salts of organic bases such as would readily occur to those skilled in the art.

The nonionic surfactant is selected from at least one member of the group of condensates of ethylene oxide with (a) a $C_4$ to $C_{24}$ alkyl primary amine or (b) a $C_4$ to $C_{24}$ alcohol; condensates of propylene oxide with (c) a $C_4$ to $C_{24}$ alkyl primary amine or (d) a $C_4$ to $C_{24}$ alcohol; condensates of ethylene oxide with (e) an alkyl phenol; and (f) an ethylene oxide-propylene oxide copolymer having a molecular weight from about 1,000 to 10,000 and a proportion derived from ethylene oxide of between about 20% to 80% by weight. The alkyl members of the amine, alcohol and phenol can be straight or branched chain, and the alkyl group(s) on the phenol can have up to about 24 carbons.

For use in continuous dyeing of articles such as carpets, a concentrated solution form of the dye is desirable. Usually, the concentration will be in the range of 15% to 25% based on the weight of the solution.

DETAILS OF THE INVENTION

The organic, water-miscible solvents employed in the dye solutions of this invention are aliphatic ethers or alcohols, of up to about 250 in molecular weight. Operable solvents will be obvious to those skilled in the art. Such solvents include cellosolve, methyl cellosolve, ethylene glycol, carbitol, methyl carbitol, butyl carbitol, $C_1$ to $C_4$ alkyl ethers of ethylene glycol and similar compounds.

A composition of the invention is typically prepared by mixing water, solvent and alkali, then dissolving the dye. The surfactants are then added in amounts up to about 13.0% of the composition weight, and dissolved.

Alkylarylsulfonates can be used as anionic surfactants in the compositions of the invention. Certain of these compounds such as sodium dodecylbenzenesulfonate are among the most widely used of all surfactants. Alkylbenzene types include examples from xylenesulfonates to trialkylbenzenesulfonates. Naphthalenesulfonates such as sodium dibutylnaphthalenesulfonate can also be employed as can sulfonated naphthaleneformaldehyde condensates.

The preferred anionic surfactant is the commercially available sulfonated naphthaleneformaldehyde condensate of the formula

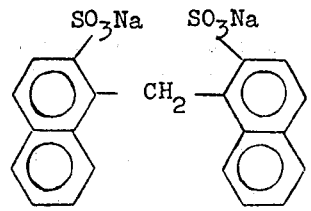

When the nonionic surfactant is ethylene oxide condensed with an amine, at least 5 moles of ethylene oxide per mole of amine is required to produce satisfactory products. When an ethylene oxide condensate with an alcohol is employed, at least 15 moles of ethylene oxide per mole of alcohol is required. When a condensation product of propylene oxide with an alcohol is employed, as few as 5 moles of propylene oxide per mole of alcohol can be employed. The hydrocarbon alcohol when condensed with ethylene oxide alone or propylene oxide alone should contain at least about 12 carbon atoms. When condensed with both ethylene oxide and propylene oxide, the alcohol can have as few as 4 carbon atoms, there being at least about 10 moles of alkylene oxide present, at least two of which are propylene oxide.

The most widely available commercial ethylene oxide-alkyl phenol additives are those obtained from nonylphenol. Compounds with eight or more ethylene oxide molecules added to one molecule of nonylphenol function satisfactorily in the compositions of the invention.

The commercial ethylene oxide-propylene oxide copolymers, called "Pluronics" are structured

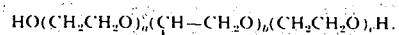

$$HO(CH_2CH_2O)_a(CH-CH_2O)_b(CH_2CH_2O)_cH$$
$$\qquad\qquad\quad |$$
$$\qquad\qquad\ CH_3$$

They are characterized by designating the molecular weight of the core derived from propylene oxide and the percent derived from ethylene oxide. The copolymers found most useful in the invention have a propylene oxide derived molecular weight of from about 950 to 2500 and an ethylene oxide derived percent by weight of from 20 to 80. The value of $a + c$ in the depicted copolymer structure is usually between 4 to 45 and the value of $b$ is usually between 16 to 42.

The preferred nonionic surfactant is the compound obtained by reacting commercial tallowamine with about 50 moles of ethylene oxide per mole of amine. Tallowamine is prepared from naturally-occurring materials and is commercially available as, essentially, a mixture of $C_{16}$ and $C_{18}$ straight chain saturated aliphatic amines, with a small amount of unsaturated chain material also present. The ethoxylated product contains molecules having less than 50 ethylene oxide units per amine molecule and some molecules containing more than 50 ethylene oxide units per amine molecule. The average number is close to 50.

A second preferred nonionic surfactant is an additive prepared from a commercially available mixture of saturated straight chain $C_{12,14}$ and $_{16}$ alcohols averaging about $C_{13}$. The additive is prepared by adding first 8 moles of ethylene oxide per mole of alcohol, then adding additionally 8 moles of propylene oxide per mole of alcohol. The starting alcohols are those commercially available mixtures prepared by the hydration of ethylene oligomers.

A partial list of operable nonionic surfactants are set out giving the trademarks and the known chemical constituency:

| | |
|---|---|
| "Merpol" DA | $C_{16-18}$ tallowamine + 50 ethylene oxide units |
| "Merpol" LFH | $C_{12-16}$ alcohol + 8 EO units and 8 propylene oxide units |
| "Alkanol" ACN | $C_{16-18}$ tallowamine + 16 EO units |
| "Igepal" CO 630 | Nonylphenol + 9 EO units |
| "Igepal" CO 890 | Nonylphenol +>30 EO units |
| "Pluronic" L-42 | 1200 M.W. of propylene oxide part + 20% EO |
| "Pluronic" P85 | 2250 M.W. of propylene oxide part + 50% EO |
| "Pluronic" F98 | 2750 M.W. of PO part + 80% EO |
| "Pluronic" L35 | 1950 M.W. of PO part + 50% EO |
| "Pluronic" F38 | 1950 M.W. of PO part + 80% EO |
| "Brij" 35 | $C_{12}$ alcohol + 25 EO units. |

A partial list of nonionic surfactants that have been found inoperable in this invention, because dye gels were formed upon attempted water dilution of solutions containing the requisite dye and the requisite anionic surfactants and said nonionic surfactants:

"Merpol" OE $C_{12-16}$ alcohol + 4.4 EO units

"Merpol" OJS $C_{12-16}$ alcohol + 8.4 EO units

"Merpol" SE $C_{13}$ alcohol + 5 EO units

"Merpol" SH $C_{13}$ alcohol + 8 EO units.

The dye compositions of the invention can be used to dye nylon, wool and other substrates amenable to dyeing with acid dyes generally. Additionally, they have been found useful for coloring polyamide, phenolformaldehyde and other resins. For these latter purposes, the proportion of anionic surfactant should be quite high vs. the nonionic surfactant. Colored mixtures of dye and resin can be applied to substrates such as glass fibers to give colored assemblies and articles made from such fibers.

The following Example illustrates the invention.

EXAMPLE

Into a suitable vessel were charged 20.0 parts of cellosolve, 5.26 parts of lithium hydroxide monohydrate and 5.26 parts of 30% sodium hydroxide aqueous solution. After heating the resulting solution to 50° to 55°C., 24.0 parts of the dye

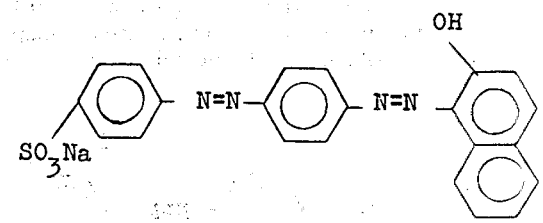

was added in the form of a water-wet filter cake containing about 36 parts of water. It was added slowly with good agitation, and when all had been added the mixture was held at 50° to 55°C. for 2 hours to complete solubilization. There were then added 1.2 parts of the nonionic surfactant $C_{16-18}H_{33-37}NH(CH_2CH_2O)_{50}H$ prepared by ethoxylation of tallowamine, and 0.3 part of the anionic surfactant

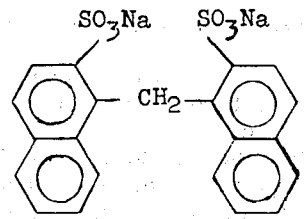

formed by condensation of formaldehyde and naphthalenesulfonic acid.

Strength of the solution was adjusted to equal a previously established standard (containing 22.8% dye) by adding additional cellosolve. Strength comparison was made by spectrophotometer. The pH of the solution was about 12.0. Before dilution, the dye concentrate contained about 1.2 nonionic surfactant and about 0.3 anionic surfactant. When this concentrate was mixed with an equal volume of water, a thin mobile liquid slurry resulted. When a composition similar to the above was prepared without the two surfactants, a similar dilution resulted in a thick gel.

The embodiments of the invention in which an exclusive property or privilege is claimed are defined as follows:

1. An improved aqueous-organic solvent solution having a pH between 10 and 13, of the disazo dye

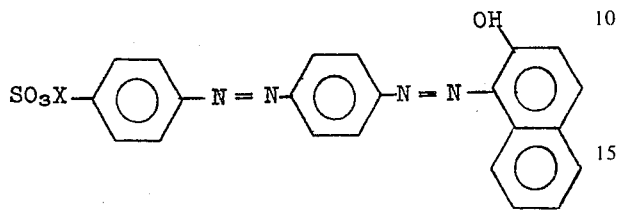

wherein X is a cation selected from the group sodium, potassium, lithium, and ammonium, the improvement comprising the presence in the dye solution of a combination of
 i. 0.1% to 10.0%, by total weight, of an anionic surfactant, and
 ii. 0.1% to 3.0%, by total weight, of a nonionic surfactant,
the ratio of anionic surfactant to nonionic surfactant being between 1 to 10 and 17 to 1, the dye solution having a dye concentration in the range of 15% to 25% based on the total weight of the solution, said solution being nongelling upon dilution with water, the anionic surfactant being a water-soluble salt of a substituted-benzene or -naphthalenesulfonic acid wherein the substituents are 1 to 3 alkyl groups of $C_1$ to $C_{14}$,
the nonionic surfactant being selected from at least one member of the group consisting of condensates of
 a. $C_4$ to $C_{24}$ alkyl primary amines and at least 5 moles of propylene oxide,
 b. $C_4$ to $C_{24}$ alkyl primary amines and at least 5 moles of ethylene oxide,
 c. $C_{12}$ to $C_{24}$ alcohols and at least 15 moles of ethylene oxide,
 d. $C_{12}$ to $C_{24}$ alcohols and a least 5 moles of propylene oxide,
 e. $C_4$ to $C_{24}$ alcohols and at least 8 moles ethylene oxide and 2 moles of propylene oxide,
 f. alkyl phenols and at least 8 moles of ethylene oxide, and
 g. ethylene oxide-propylene oxide copolymer having a molecular weight from about 1,000 to 10,000 and a proportion derived from ethylene oxide of 20 to 80 weight percent.

2. An improved aqueous-organic solvent solution having a pH between 10 and 13, of the disazo dye

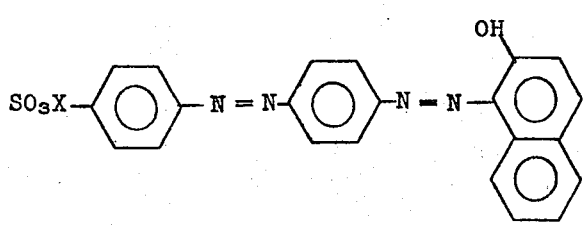

wherein X is a cation selected from the group sodium, potassium, lithium, and ammonium, the improvement comprising the presence in the dye solution of a combination of
 i. 0.1% to 10.0%, by total weight, of an anionic surfactant, and
 ii. 0.1% to 3.0%, by total weight, of a nonionic surfactant,
the ratio fo anionic surfactant to nonionic surfactant being between 1 to 10 and 17 to 1, the dye solution having a dye concentration in the range of 15% to 25% based on the total weight of the solution, said solution being nongelling upon dilution with water, the anionic surfactant being

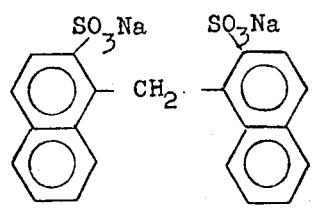

the nonionic surfactant being selected from at least one member of the group consisting of condensates of
 a. $C_4$ to $C_{24}$ alkyl primary amines and at least 5 moles of propylene oxide,
 b. $C_4$ to $C_{24}$ alkyl primary amines and at least 5 moles of ethylene oxide,
 c. $C_{12}$ to $C_{24}$ alcohols and at least 15 moles of ethylene oxide,
 d. $C_{12}$ to $C_{24}$ alcohols and at least 5 moles of propylene oxide,
 e. $C_4$ to $C_{24}$ alcohols and at least 8 moles ethylene oxide and 2 moles of propylene oxide,
 f. alkyl phenols and at least 8 moles of ethylene oxide, and
 g. ethylene oxide-propylene oxide copolymer having a molecular weight from about 1,000 to 10,000 and a proportion derived from ethylene oxide of 20 to 80 weight percent.

3. A dye solution according to claim 2 wherein the nonionic surfactant is selected from a condensate of ethylene oxide with amine, and a condensate of ethylene oxide and propylene oxide with alcohol.

4. A dye solution according to claim 3 wherein the condensate of ethylene oxide with amine is a condensate of about 50 moles of ethylene oxide per mole of amine, the amine being essentially a mixture of $C_{16}$ and $C_{18}$ straight chain saturated amines, and the condensate of ethylene oxide and propylene oxide with alcohol is a condensate of 8 moles of each of ethylene oxide and propylene oxide per mole of alcohol, the alcohol being a mixture of saturated straight chain $C_{12}$, $C_{14}$ and $C_{16}$ alcohols averaging about $C_{13}$.

5. A dye solution according to claim 4 wherein the nonionic surfactant is $C_{16-18}H_{33-37}NH(CH_2CH_2O)_{50}H$.

* * * * *